US010765085B1

(12) United States Patent
Studebaker, Jr.

(10) Patent No.: US 10,765,085 B1
(45) Date of Patent: Sep. 8, 2020

(54) APPARATUS, SYSTEM AND METHOD FOR AN ADJUSTABLE LIVESTOCK ALLEY

(71) Applicant: Robert L. Studebaker, Jr., Tulsa, OK (US)

(72) Inventor: Robert L. Studebaker, Jr., Tulsa, OK (US)

( * ) Notice: Subject to any disclaimer, the term of this patent is extended or adjusted under 35 U.S.C. 154(b) by 355 days.

(21) Appl. No.: 15/656,216

(22) Filed: Jul. 21, 2017

Related U.S. Application Data

(60) Provisional application No. 62/365,223, filed on Jul. 21, 2016.

(51) Int. Cl.
*A01K 1/06* (2006.01)
(52) U.S. Cl.
CPC .................................. *A01K 1/0613* (2013.01)
(58) Field of Classification Search
CPC ........ A01K 1/0613; A01K 1/06; B61D 3/163; B60P 3/04
USPC .......................................................... 119/843
See application file for complete search history.

(56) References Cited

U.S. PATENT DOCUMENTS

| | | | | |
|---|---|---|---|---|
| 2,523,700 A * | 9/1950 | Kribs | ................... | A01K 1/0613 119/725 |
| 2,650,567 A * | 9/1953 | Whitworth | ........... | A01K 1/0613 119/733 |
| 3,099,249 A * | 7/1963 | Newhouse, Jr. | ..... | A01K 1/0613 119/733 |
| 3,766,890 A * | 10/1973 | Baker | ................... | A01K 1/0613 119/751 |
| 3,960,113 A * | 6/1976 | Kratky | ................. | A01K 1/0613 119/723 |
| 4,048,961 A * | 9/1977 | Priefert | ................ | A01K 1/0613 119/752 |
| 4,214,555 A * | 7/1980 | Sawby | ................. | A01K 1/0613 119/723 |
| 4,355,594 A * | 10/1982 | Wagner | ..................... | B60P 3/04 119/400 |
| 4,579,084 A * | 4/1986 | McCan | ................ | A01K 1/0613 119/731 |
| 5,129,362 A * | 7/1992 | Ferrell | ................. | A01K 1/0613 119/502 |
| 5,184,572 A * | 2/1993 | Meier | .................. | A01K 1/0613 119/733 |
| 5,645,016 A * | 7/1997 | Mahurin | .................. | A61D 3/00 119/752 |
| 6,239,711 B1 * | 5/2001 | Downey | .............. | A01K 1/0023 340/528 |

(Continued)

FOREIGN PATENT DOCUMENTS

FR    2936397 A1 * 4/2010 ........... A01K 1/0613

*Primary Examiner* — Magdalena Topolski
*Assistant Examiner* — Morgan T Barlow
(74) *Attorney, Agent, or Firm* — Frederic Dorwart, Lawyers PLLC; Penina Michlin Chiu (57) ABSTRACT

An adjustable livestock alley system includes an animal passageway formed by two opposing passageway sides, a width of the animal passageway adjustable by a first drill-operated top wind jack that actuates both passageway sides simultaneously inward and simultaneously outward symmetrically about a centerline of the animal passageway, and a no-backs rail including a plurality of no-backs, a height of the no-backs rail adjustable by a second drill-operated top wind jack that actuates the no-backs rail upwards and downwards.

8 Claims, 10 Drawing Sheets

(56) References Cited

U.S. PATENT DOCUMENTS

| | | | |
|---|---|---|---|
| 6,425,351 B1* | 7/2002 | Mollhagen | A01K 1/0613 119/733 |
| 6,502,531 B1* | 1/2003 | Pound | A01K 1/0613 119/728 |
| 7,213,539 B1* | 5/2007 | Mollhagen | A01K 1/0029 119/843 |
| 8,910,595 B2* | 12/2014 | Ulrich | A01K 1/0613 119/732 |
| 2003/0140870 A1* | 7/2003 | Daniels | A01K 1/0613 119/752 |
| 2004/0168652 A1* | 9/2004 | Priefert | A01K 1/0613 119/733 |
| 2005/0132978 A1* | 6/2005 | Bentz | A01K 1/0613 119/732 |
| 2006/0191492 A1* | 8/2006 | Ross | A01K 1/0613 119/734 |
| 2013/0061818 A1* | 3/2013 | Ulrich | A01K 1/0613 119/729 |
| 2013/0192538 A1* | 8/2013 | Ulrich | A01K 1/0613 119/740 |
| 2015/0264889 A1* | 9/2015 | Beavers | A01L 13/00 119/723 |
| 2016/0192618 A1* | 7/2016 | Punt | A01K 1/0613 119/729 |
| 2018/0042200 A1* | 2/2018 | Gipson | A01K 1/0613 |

* cited by examiner

FIG. 11

APPARATUS, SYSTEM AND METHOD FOR AN ADJUSTABLE LIVESTOCK ALLEY

CROSS REFERENCE TO RELATED APPLICATIONS

This application claims the benefit of U.S. Provisional Application No. 62/365,223 to Studebaker, Jr., filed Jul. 21, 2016 and entitled "APPARATUS, SYSTEM AND METHOD FOR AN ADJUSTABLE LIVESTOCK ALLEY," which is hereby incorporated by reference in its entirety

BACKGROUND OF THE INVENTION

1. Field of the Invention

Embodiments of the invention described herein pertain to the field of handling livestock. More particularly, but not by way of limitation, one or more embodiments of the invention enable an apparatus, system and method for an adjustable livestock alley.

2. Description of the Related Art

Livestock producers often need to handle animals such as cattle, horses or sheep in order to perform medical treatment, health or other maintenance (such as vaccinations), artificial insemination, pregnancy testing and other procedures on the animals. Both prior to and during such procedures, it is crucial to contain the animal being handled, as well as the animals waiting to be handled. In this way, the relevant procedure can be efficiently performed on multiple animals in succession, and so as not to injure the technician performing the procedure, the animal being handled or other animals or bystanders.

Alleyways are walk-through passage structures that are used for directing livestock from a pen or field to a head gate, squeeze chute or the like. For example, cattle may be directed into a squeeze chute using an alleyway that may be placed behind the squeeze chute. The alleyway forces the animals into a single-file line so that each animal can be handled individually. Conventionally, alleyways consist of fence posts mounted in the ground with fence panels affixed between the posts to form a passage. In order for an alleyway to effectively guide animals, care must be taken to ensure that each animal fits snugly inside the width of the alley. If an animal has extra room to its left or right, it may turn, bend or otherwise undesirably move inside the alley, risking injury to the animal, the technician or the other animals.

One problem with traditional alleyways is that a single width alley is used for both small and large animals. For example, larger cattle breeds and bulls may require alleys as wide as about 31 inches, but calves may only require a width of about 18 inches. If the passage is too wide, the animals will attempt to turn around within the alley. Once the animal turns, it is difficult to re-orient the animal and maintain movement through the alley. If the alley is designed to accommodate smaller animals such as calves, full grown cattle do not fit through the alley. Often is not feasible for a livestock producer to have multiple alleys with different widths.

Some attempts have been made to design alleyways that are adjustable in width. For example, the sides of the alley may sometimes be adjusted, one side at a time, using complicated pins and levers or hydraulics. The adjustment is time intensive and costly due to the man-hours required to painstakingly move one side or panel at a time. In addition, adjusting one side of the alley at a time causes the passageway to become un-centered, causing undesirable difficulties in reaching animals from both sides of the alley. In another conventional example, the alley is adjusted from the top of the alleyway by hand crank. In such an instance, a catwalk is constructed on both sides of the alley so that the producer or handler can reach and hand-wind the crank at the top. The catwalk obstructs the ability of the livestock producer to reach into the alleyway to take samples or treat the cattle. In addition, standing up-high on the catwalk is dangerous while in the vicinity of herds of unpredictable animals. Yet other conventional designs include side panels that block the handlers from reaching into the alleyway, preventing needed access to the animals inside the alleyway.

As is apparent from the above, current adjustable livestock alleys suffer from many shortcomings. Therefore, there is a need for an improved apparatus, system and method for an adjustable livestock alley.

BRIEF SUMMARY OF THE INVENTION

One or more embodiments enable an apparatus, system and method for an adjustable livestock alley.

An apparatus, system and method for an adjustable livestock alley is described. An illustrative embodiment of an adjustable livestock alley includes an alley frame, a pair of opposing passageway sides pivotably coupled to the alley frame, the pair of opposing passageway sides defining a passageway having a centerline, wherein a width of the passageway is symmetric about the centerline, the pair of opposing sides concurrently moveable inward of the alley frame to narrow the passageway symmetrically about the centerline of the passageway, a windable jack coupled on a first side of the windable jack to the alley frame, the windable jack coupled on a second side of the windable jack to each passageway side of the pair of opposing passageway sides by an actuatable system of rails, wherein winding the windable jack actuates the actuatable system of rails to move the pair of opposing passageway sides symmetrically about the centerline of the passageway to adjust the width of the passageway, and the windable jack windable by a cordless drill. In some embodiments, the adjustable livestock alley further includes a no-backs rail extending parallel to a ground along a length of the passageway, the no-backs rail moveably coupled to a top of the frame, the no-backs rail including a plurality of no-backs spaced along the no-backs rail, the no-backs rail moveable to adjust a height of the no-backs rail from the ground, a second windable jack coupled on a first side of the second windable jack to the frame, the second windable jack coupled on a second side of the second windable jack to the no-backs rail by a second actuatable system of rails, wherein winding the second windable jack actuates the second actuatable system of rails to adjust the height of the no-backs rail from the ground, and the second windable jack windable by the cordless drill. In certain embodiments, the no-backs rail is attached to the second actuatable system of rails with an adjuster strut, the adjuster strut coupled to two sides of the no-backs rail with a strut bracket, the strut bracket extending around a top and the two sides of the strut bracket and the adjuster strut secured through both of the two sides of the strut bracket, and the adjuster strut coupled to a member of the second actuatable system of rails. In some embodiments, the no-backs rail includes steel, square tubing. In some embodiments, each no-backs of the plurality of no-backs are moveably attached to the no-backs rail, and spacing between adjacent no-backs is adjustable by sliding each no-backs along the no-backs rail. In certain embodiments, each no-back of the plurality of no-backs includes a U-shaped portion having an opening configured to allow blood and hair samples to be taken under a tail of an animal. In some embodiments, the windable jack rotates in two directions, and one direction of the two directions actuates the pair of opposing passageway sides inward of the alley frame to narrow the passageway and the second direction of the two directions actuates the pair of opposing passageway sides outward towards the alley frame to widen the passageway. In certain embodiments, the passageway is configured for cattle and the passageway adjusts between 18 inches and 32 inches in width. In some embodiments, the adjustable livestock alley further includes at least one sliding end gate, and wherein an exit of the passageway is coupled to a squeeze chute, and the sliding end gate protects an operator stepping into the squeeze chute. In some embodiments, the windable jack is configured to be interchangeably windable by both of the cordless drill and a jack handle. In certain embodiments, the actuatable system of rails includes a cross rail extending between two sides of the alley frame, the cross rail connected to a cylinder of the first windable jack, the two sides of the alley frame parallel to the pair of opposing passageway sides, the cross rail rotatable by extension and retraction of the cylinder, the cross rail including a hanger extending from the cross rail, and a pair of bars forming a V-shape, a first bar of the pair of bars pivotably connected to the hanger on a first side and pivotably connected to a first passageway side of the pair of opposing passageway sides on a second side of the first bar, and a second bar of the pair of bars pivotably connected to the hanger on a first side and pivotably connected to a second passageway side of the pair of opposing passageway sides on a second side of the second bar, wherein when the cylinder extends the passageway narrows in width and when the cylinder retracts the passageway widens in width.

An illustrative embodiment of a method of adjusting a livestock alley includes operating a handheld cordless drill to wind a first wind jack, the first wind jack coupled to a pair of opposing passageway sides of the livestock alley, the pair of opposing passageway sides defining an animal passageway, winding the first wind jack using the handheld cordless drill to simultaneously move each passageway side of the pair of opposing passageway sides one of closer together, father apart or a combination thereof to adjust a width of the animal passageway symmetrically about a centerline of the animal passageway, and adjusting a height of a no-backs rail by winding a second wind jack with the handheld cordless drill, the second wind jack coupled to the livestock alley. In some embodiments the method of adjusting the livestock alley further includes adjusting spacing between adjacent no-backs of a plurality of no-backs secured along a length of the no-backs rail. In some embodiments, the spacing between adjacent no-backs is adjusted based on a length of livestock to pass through the passageway. In some embodiments the method of adjusting the livestock alley further includes securing the no backs rail from wobbling by attaching the no-backs rail to an actuatable system of rails using a strut adjuster system that secures around three sides of the no-backs rail. In some embodiments the method of adjusting the livestock alley further includes employing end segments between corners of a frame of the livestock alley and the pair of opposing passageway sides to prevent openings between the frame and the pair of opposing passageway sides despite adjustment of the width of the animal passageway. In certain embodiments, the width of the animal passageway is adjusted based on a width of livestock to pass through the animal passageway, and the height of the no-backs rail is adjusted based on a height of the livestock to pass through the animal passageway.

An illustrative embodiment of an adjustable livestock alley system includes an animal passageway formed by two opposing passageway sides, a width of the animal passageway adjustable by a first drill-operated top wind jack that actuates both passageway sides simultaneously inward and simultaneously outward symmetrically about a centerline of the animal passageway, and a no-backs rail including a plurality of no-backs, a height of the no-backs rail adjustable by a second drill-operated top wind jack that actuates the no-backs rail upwards and downwards.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

An apparatus, system and method for an adjustable livestock alley will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a tube includes one or more tubes.

As used herein tubes, pipes, rails and bars may be used interchangeably to form an alleyway of illustrative embodiments, unless explicitly stated otherwise One or more embodiments of the invention provide an apparatus, system and method for an adjustable livestock alley. While for ease of description and so as not to obscure the invention, illustrative embodiments are described in terms of a cattle embodiment, nothing herein is intended to limit the invention to that embodiment. The invention may be applied equally to other domestic herd or herd-like animals, such as horses, sheep, goats, bison or other livestock.

Illustrative embodiments include an apparatus, system and method for an adjustable livestock alley. Illustrative embodiments may provide an adjustable animal alleyway customizable to the width, height and/or length of the animals anticipated to pass through and/or be held in the alley. Illustrative embodiments may allow the width of a livestock alley to be adjusted based on the size of the animals to be guided through the alley. The width of the alley passageway may be adjusted to fit the width of animals anticipated to pass through in a single file, without allowing the animals enough space to turn or bend in the alleyway. In order to adjust the width of the passageway, opposing sides of the alleyway may adjust simultaneously inwards towards one another to narrow the passageway, or simultaneously outwards away from one another to widen the passageway. Simultaneous adjustment of both sides may allow the passageway to remain centered in the alley so that animals inside may be reached by a handler, technician or rancher from either side, and may also save time and cost associated with the adjustment. Illustrative embodiments may include "no-backs" that are spaced on a no-backs rail extending centrally along the length of the passageway. The no-backs may prevent animals inside the alleyway from backing up. The no-backs rail of illustrative embodiments may be adjustable in height based on the height of the animals anticipated to be inside the alleyway. The no-backs, may also slide along the no-backs rail, and may be secured at desired intervals to accommodate animals of different lengths. An improved strut bracket may be employed to moveably support the no-backs rail hanging from the frame. The strut bracket of illustrative embodiments may support the no-backs rail on both sides of the no-backs rail. Illustrative embodiments of a strut bracket and strut may prevent the no-backs rail from wiggling during adjustment and/or use and/or prevent unwanted movement of no-backs.

Illustrative embodiments provide for a livestock alley including one or more drill-operated wind jacks. The top wind jacks may be modified to include a socket for a drill instead of a jack handle. The top wind jacks may actuate a system of actuatable rails that adjust both sides of the alley simultaneously (at the same time) and/or adjust the height of the no-backs. Illustrative embodiments allow a livestock alleyway to be adjusted to accommodate animals of varying sizes, including animals of various widths, heights and/or lengths. The adjustable passageway sides of illustrative embodiments may be unobstructed by panels and catwalks, and the animal passageway may remain centered in the alley despite adjustments in width, allowing animals inside the alleyway to be accessible from both sides.

Figure 1:
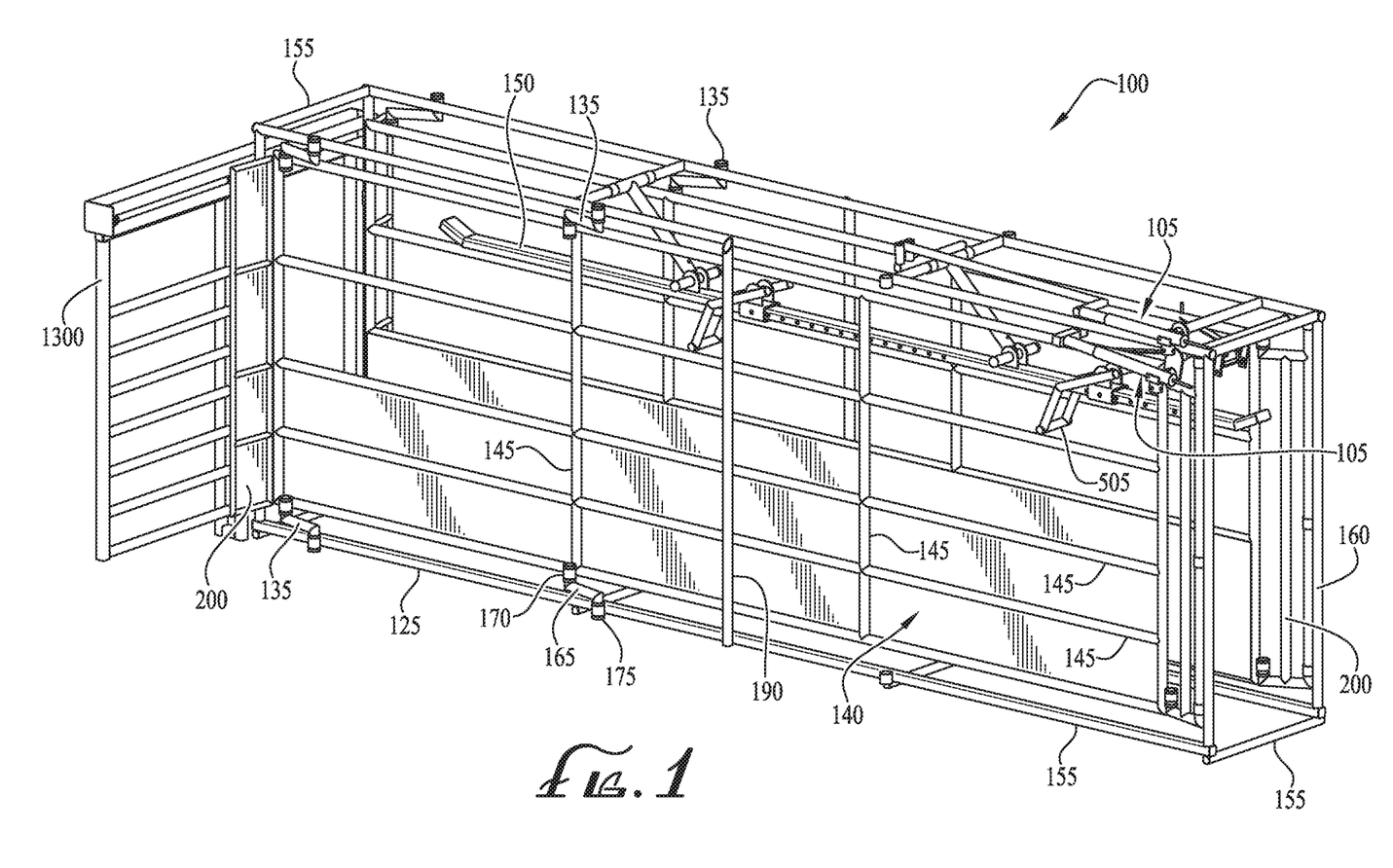
FIG. 1 is a perspective view of an animal alley of an illustrative embodiment.

FIG. 1 illustrates an adjustable livestock alley of an illustrative embodiment. Alley 100 may be comprised of steel bars, rails, tubes and/or pipes, for example schedule 40 or schedule 80 steel. Square and rectangular tubing may be 0.188 inch or 0.25 inch wall. In some embodiments, steel hollow tubing may be preferable to solid bars to reduce the weight of alley 100. Alley 100 of illustrative embodiments may be delivered fully assembled. The length of alley 100 may be any desired length, such as 20 feet in length, 24 feet in length, or any other length through which livestock may need to be guided and/or held in single-file. Passageway sides 140 may extend the length of alley 100 inside frame 125. Frame 125 may provide a static supportive structure from which adjustable passageway sides 140 may pivot, slide, move and/or adjust. Frame 125 may be cuboid in shape, such as a right rectangular prism where opposite faces are rectangular and equal. Post 190 of frame 125 may extend vertically in a position outward of passageway side 140, and thus post 190 may prevent outward movement of passageway side 140 beyond post 190 and/or frame 125. Frame 125 may include horizontal frame tubing 155 at the top and/or bottom of frame, and vertical frame tubing 160. Frame 125 may provide a skeletal supportive structure for alley 100.

Figure 2A:
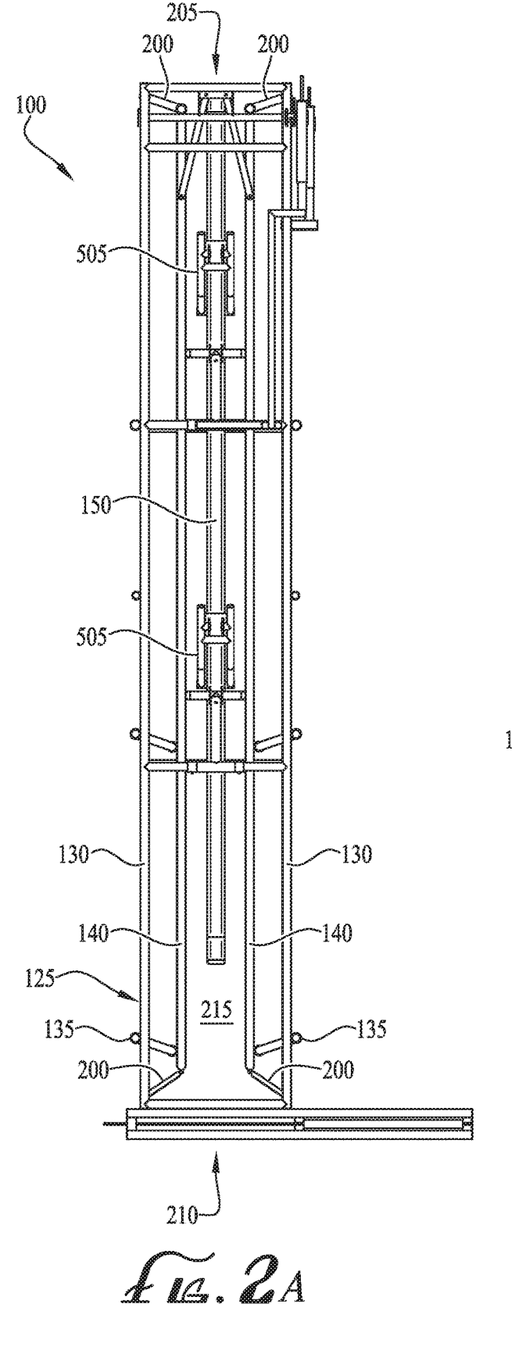
FIG. 2A is a top plan view of an exemplary animal alley having a narrowed animal passageway of an illustrative embodiment.
Figure 2B:
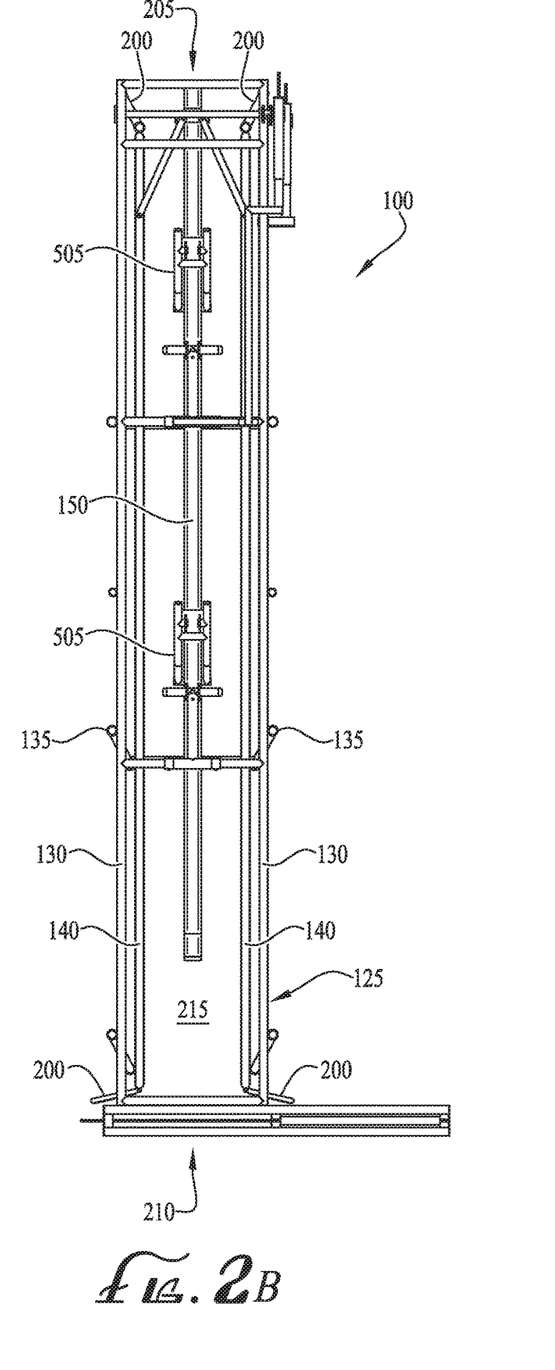
FIG. 2B is a top plan view of an exemplary animal alley having a wide animal passageway of an illustrative embodiment.
Figure 12A:
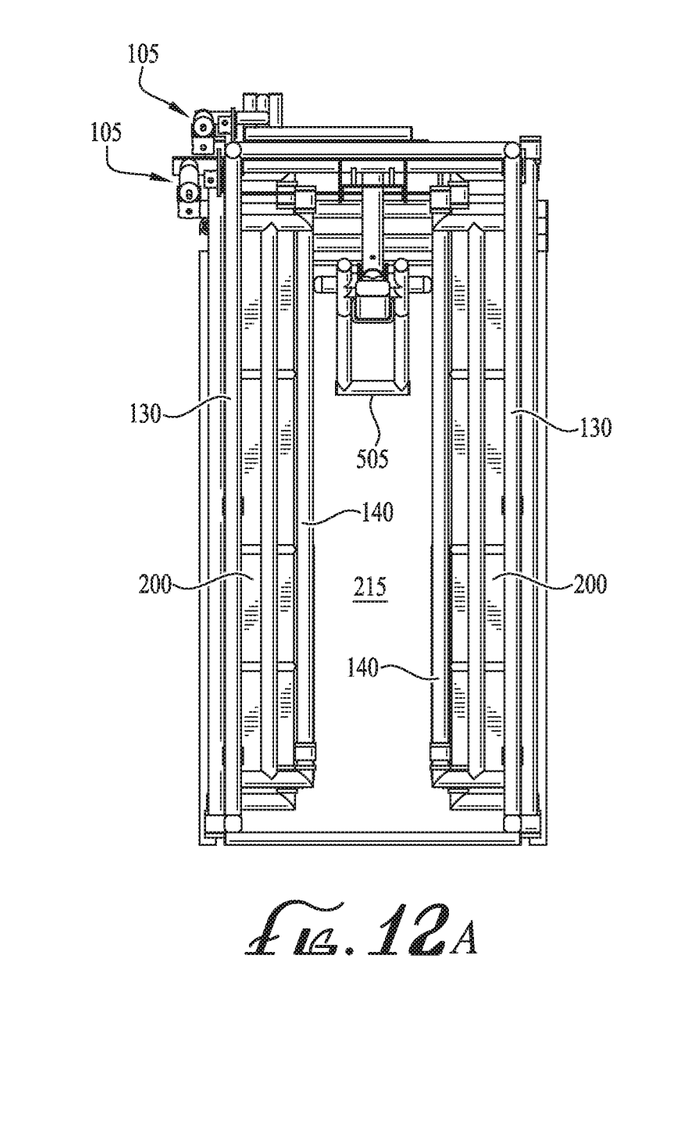
FIG. 12A is a front elevation view of an animal alley of an illustrative embodiment with an exemplary animal passageway in a narrow position.
Figure 12B:
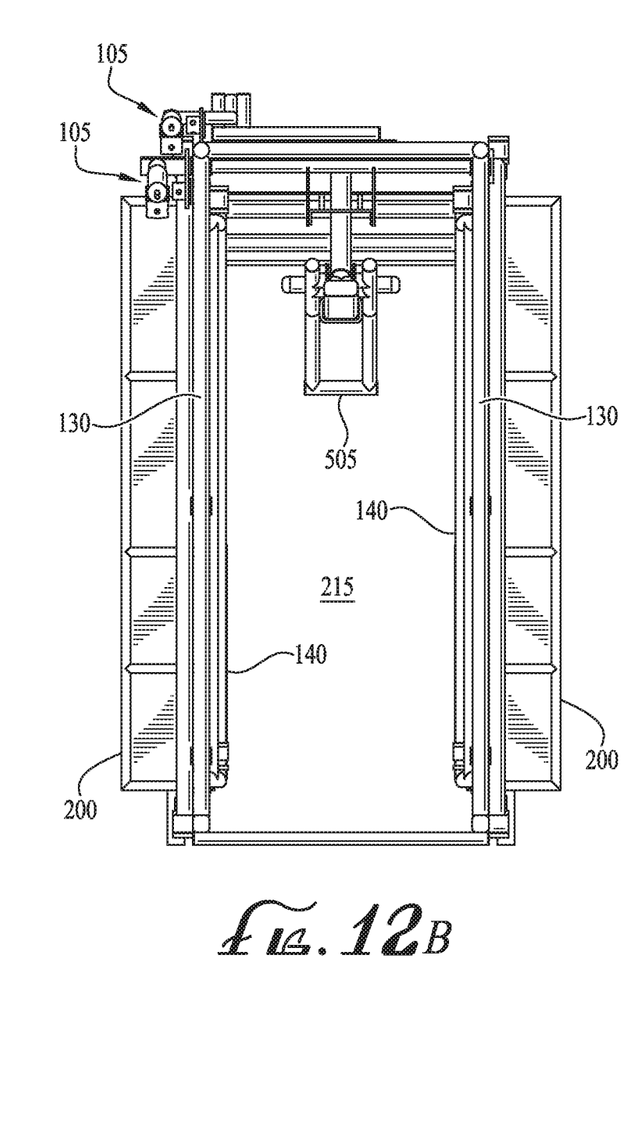
FIG. 12B is a front elevation view of an animal alley of an illustrative embodiment with an exemplary animal passageway in a wide position.

Passageway sides 140 may include a plurality of horizontal and vertical passageway pipes 145 spaced apart from one another such that a rancher or other technician may both see through and reach through pipes 145 on both passageway sides 140 where panels 420 (shown in FIG. 4) are not present. Passageway sides 140 may be moveable inwards from frame 125 using pivots 135, with a pivot inward resulting in a narrower animal passageway 215 (shown in FIG. 2A). FIG. 2A illustrates alley 100 with passageway sides 140 actuated inwards. Similarly, pivots 135 may allow opposing passageway sides 140 to move outwards, away from one another and towards frame 125, resulting in a wider alley 100. FIG. 2B illustrates an alley 100 with passageway sides 140 actuated outwards proximate frame sides 130. Pivots 135 may be rotatable connections between frame 125 and passageway sides 140 and may be spaced at intervals along passageway sides 140 at both the top and bottom of passageway sides 140. Returning to FIG. 1, pivots 135 may include horizontally extending rail 165 with a vertically extending rail on each end pointing in opposite directions, similar to a step shape. For pivots 135 that connect the bottom side of passageway side 140 to frame 125, an upward vertical rail 170 on one side of horizontal rail 165 may extend vertically upwards from horizontal rail 165 and connect to passageway pipe 145. A downward vertical rail 175 on a second side of horizontal rail 165 may extend vertically downwards and connect to frame tubing 155. For pivots 135 at the top of passageway side 140, the position of upward vertical rail 170 and downward vertical rail 175 may be reversed about horizontal rail 165. Vertical rails 170, 175 may pivot, hinge and/or rotate with respect to frame tubing 155 and/or passageway pipe 145, allowing passageway side 140 to move into a series of positions inward of frame 125. FIG. 12A illustrates alley 100 with an exemplary narrow animal passage 215, from the perspective of entrance side 205 looking into alley 100. FIG. 12B illustrates alley 100 with an exemplary wide animal passage 215, from the perspective of entrance side 205 looking into alley 100.

Figure 3:
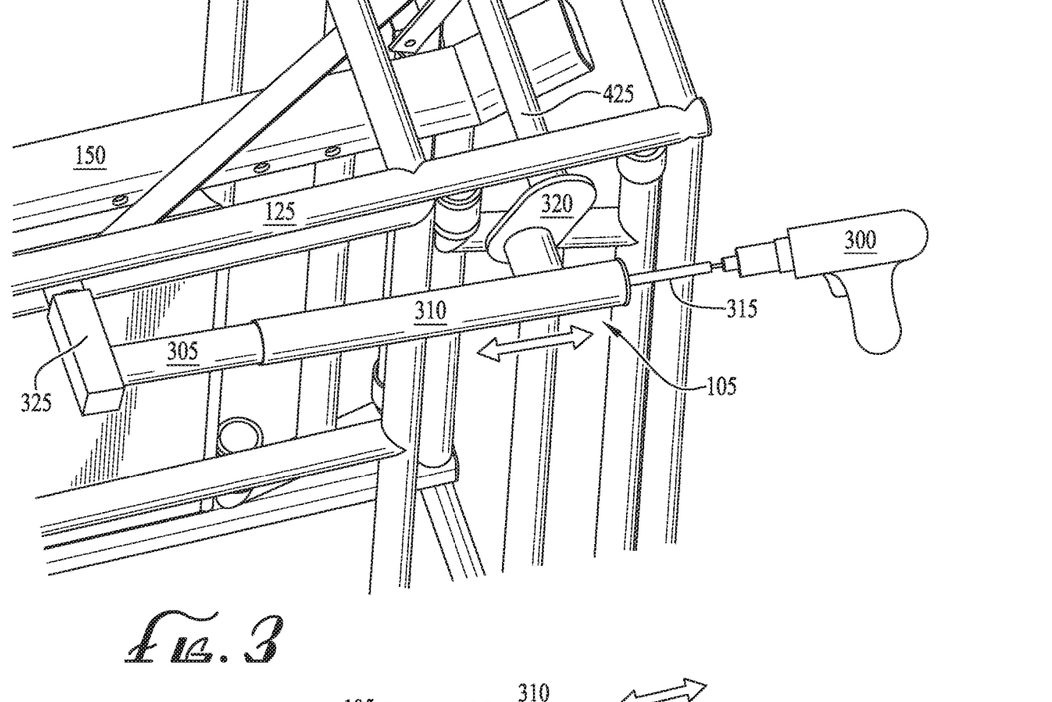
FIG. 3 is a perspective view of a wind jack of an illustrative embodiment actuating the width of an animal passageway of an exemplary alley.

Passageway sides 140 may be actuated inward or outward by wind jack 105. When actuating inward or outward, both passageway sides 140 may move inward or outward at the same time and at the same speed such that the centerline of passageway 215 through alley 100 remains in an unchanged location regardless of the particular width setting selected. FIG. 3 illustrates a jack of an illustrative embodiment. Jack 105 may be a top wind jack, a side wind jack, a hitch jack, a trailer jack or another similar type of jack. In some embodiments, rather than employing a wind jack, hydraulic cylinders may be employed. Wind jack 105 may include a telescoping cylinder 310 that retracts around or extends apart from shaft 305, depending on the direction in which wind jack 105 is turned, wound and/or rotated. Wind jack 105 may be rotated by a handheld, cordless drill 300, which drill may be insertable into socket 315 at the end of top wind jack 105. Wind jack 105 may be secured, coupled and/or connected to passageway side 140 and/or cross rail 425 by joint 320, which may be a bracket, clamp, rail, sleeve and bar and/or another similar attachment that allows cross rail 425 to rotate about its own axis when pushed or pulled by cylinder 310. The side of wind jack 105 including shaft 305 may be attached, connected and/or coupled to frame 125, such as by connecting bar 325 that may extend between shaft 305 and frame 125. In some embodiments, a wind handle may be attached to socket 315 in wind jack 105, rather than drill 300, so as to be manually operated for example in instances of battery failure of drill 300 or where drill 300 is not otherwise available. Socket 315 of wind jack 105 may extend downwards from frame 125 so as to be reachable by a human operator standing on the ground next to frame 125. Once the position of wind jack 105 is set, passageway sides 140 may remain secured at the desired width setting by virtue of the lock provided by wind jack 105, since wind jack 105 may not extend or retract in the absence of intentional winding.

Figure 4A:
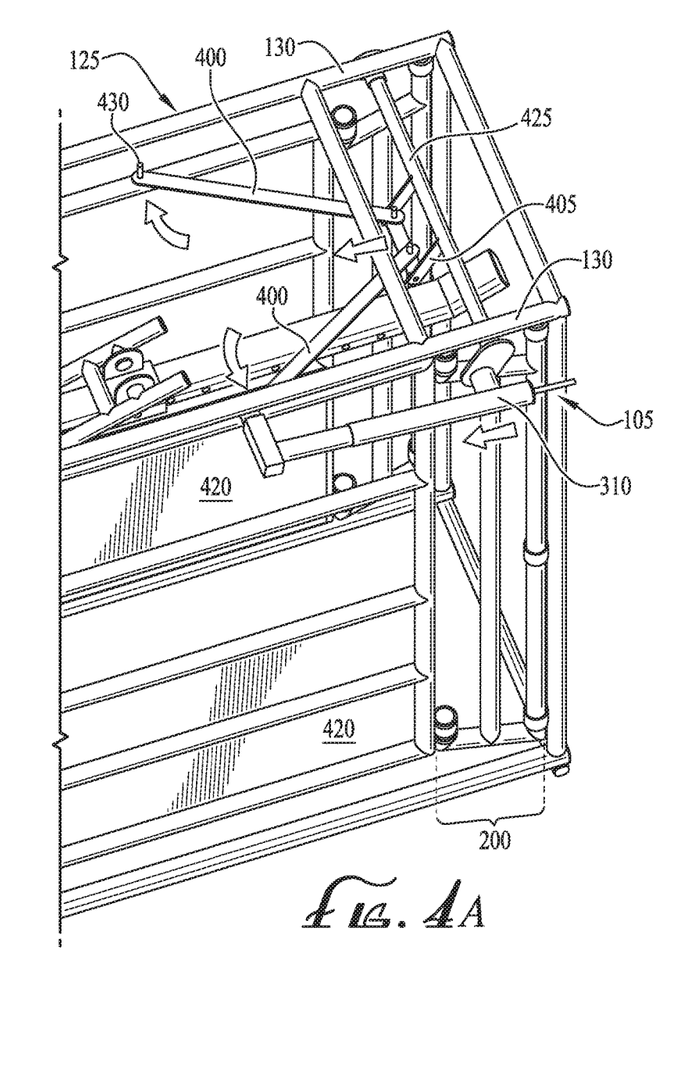
FIG. 4A is a perspective view of an animal alley of an illustrative embodiment actuating to widen an exemplary animal passageway.
Figure 4B:
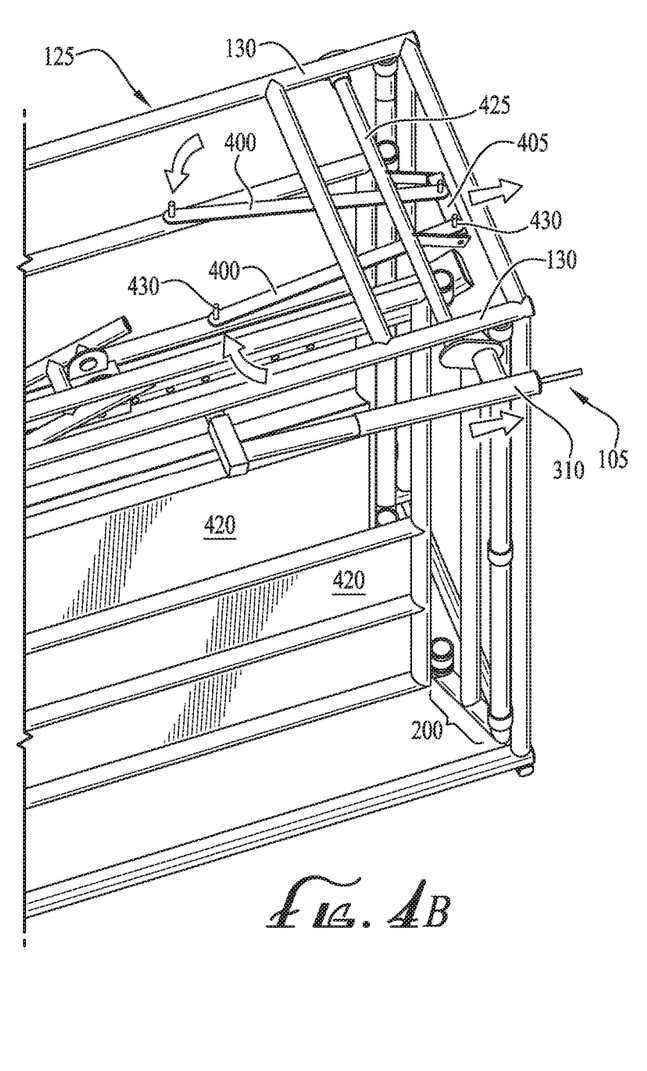
FIG. 4B is a perspective view of an animal alley of an illustrative embodiment actuating to narrow an exemplary animal passageway.

As cylinder 310 and/or shaft 305 of wind jack 105 telescopes, extends and/or retracts, an actuating, sliding, rotating and/or pivoting system of rails, pipes, bars and/or tubes may cause passageway sides 140 to move, pivot and/or slide inward or outward, depending on the direction of rotation of drill 300 and/or whether jack 105 is extending or retracting. An illustrative embodiment of an actuatable rail system is illustrated in FIG. 4A and FIG. 4B. At the top of frame 125, cross rail 425 may extend between opposing frame sides 130 across the width of alley 100. Cross rail 425 may be rotatably mounted on frame 125 such that cross rail 425 may turn in both a clockwise and counterclockwise direction in response to jack 105 extending or retracting. As shown FIG. 4A, jack 105 is retracting, causing cross rail 425 to rotate in a clockwise direction. In FIG. 4B, jack 105 is shown extending, causing cross rail to rotate in a counter-clockwise direction. Cross rail 425 may include hanger 405 that extends to hang below cross rail 425. A pair of diagonal bars 400 arranged in a "V" shape may be connected to hanger 405 on one side, and each diagonal bar 400 may connect to one of the passageway sides 140 on its second side. Diagonal bars 400 may be attached to hanger 405 and passageway sides 140 with pins 430, around which diagonal bars 400 may rotate and/or pivot. Diagonal bars 400 may be closer together at hanger 405, and farther apart at passageway sides 140. Each diagonal bar 400 may attach to one of the passageway sides 140. As cylinder 310 extends or retracts, the force provided by movement of cylinder 310 against a stationary shaft 305 secured against nonmoving frame 125, may cause passageway sides 140 to pivot, slide and/or swing inwards or outwards. The motion of passageway sides 140 may adjust the width of animal passageway 215 inside alley 100. In FIG. 4A, animal passageway 215 is widening, and in FIG. 4B, animal passageway 215 is narrowing. In some embodiments, passageway sides 140 may include steel panels 420, which may be low enough on passageway sides 140 so as not to obstruct the ability of an animal producer or handler to reach the animals for maintenance and/or low enough to allow the animals inside alley 100 to see outside.

End segments 200 may swivel to follow the motion of passageway sides 140, which may prevent openings in passageway sides 140 proximate corners of frame 125, despite the particular and/or varying position of passageway sides 140. Returning to FIG. 2A and FIG. 2B, end segments 200 may connect frame 125 to passageway sides 140 at entrance side 205 and/or exit side 210 of frame 125 and/or proximate corners of frame 125. FIG. 2B illustrates passageway 215 inside alley 100 at its maximum width. In this example, passageway sides 140 are proximate frame sides 130 and end segments 200 on exit side 210 may fold and/or swing inward to rest against exit side 210 of frame 125, about perpendicularly to passageway sides 140. End segments 200 on entrance side 205 may swing and/or extend outward to move substantially into alignment with passageway side 140. FIG. 2A illustrates alley 100 with a narrow animal passageway 215. Upon narrowing of passageway 215 of alley 100, end segments 200 on exit side 210 may swing and/or open outward to follow sides 140, and end segments 200 on entrance side 205 may fold inward toward entrance side 205. In some embodiments, the direction of swing and/or movement of end segments 200 on entrance side 205 and exit side 210 of alley 100 may be reversed.

Figure 5A:
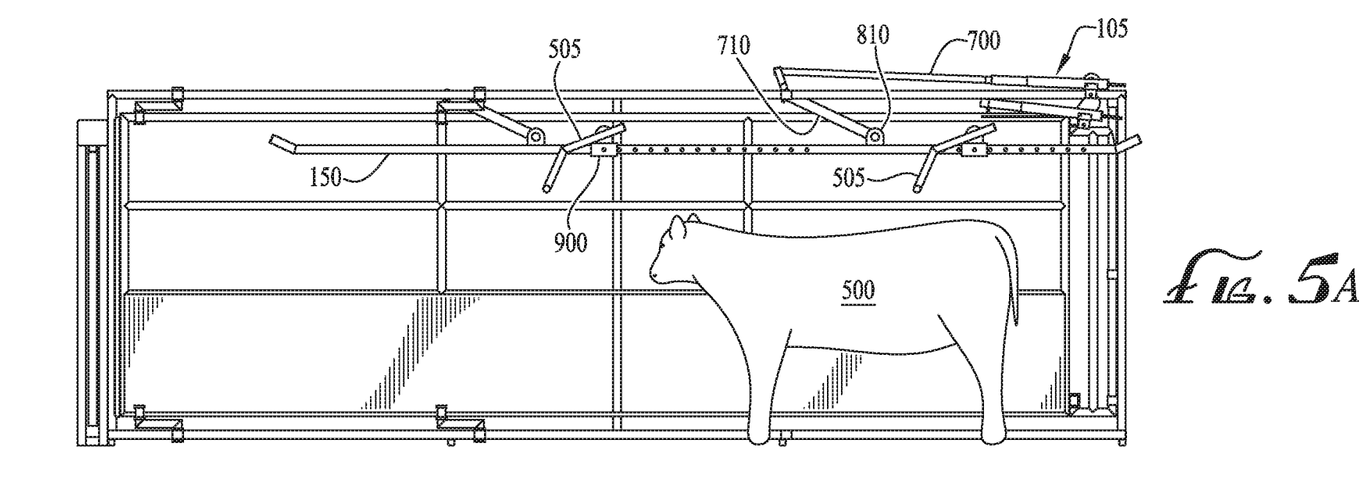
FIG. 5A is a side elevation view of a no-backs rail of an illustrative embodiment in a raised position.
Figure 5B:
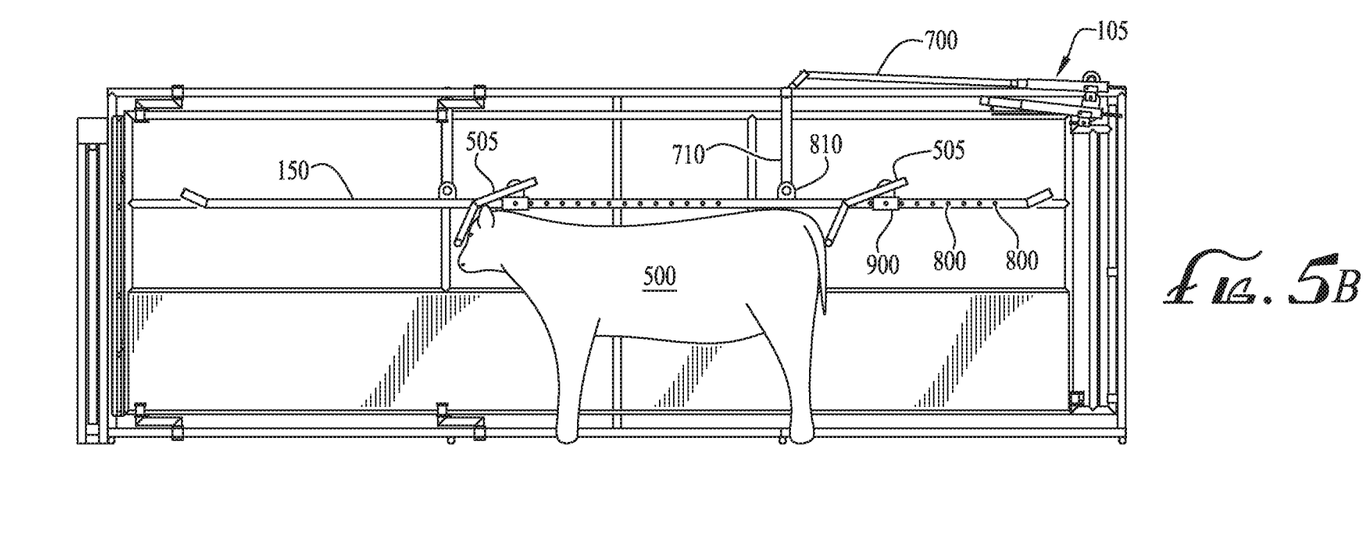
FIG. 5B is a side elevation view of a no-backs rail of an illustrative embodiment lowered to a height suitable for an exemplary animal inside an alley of an illustrative embodiment.
Figure 6:
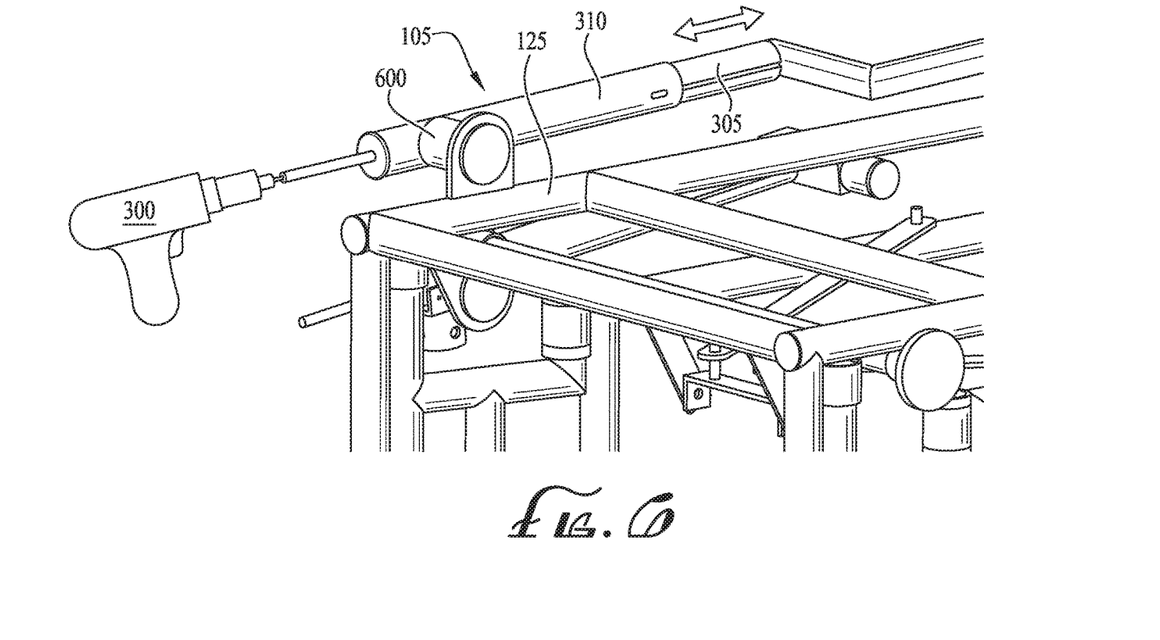
FIG. 6 is a perspective view of a wind jack of an illustrative embodiment actuating the height of a no-backs rail of an illustrative embodiment.

Illustrative embodiments may include adjustable no-backs. No-backs may be U-shaped pieces that fit underneath an animal's tail and prevent the animal from backing up inside alley 100. FIG. 5A and FIG. 5B illustrate adjustable no-backs of an illustrative embodiment. In FIG. 5B, no-backs 505 are shown at the proper height for animal 500. No-backs 505 may be raised or lowered to the correct height for animals 500 of varying heights. When at the proper height as shown in FIG. 5B, no-backs 505 may prevent animal 500 from undesirably backing up inside passageway 215. Wind jack 105 may be employed to raise and lower no-backs 505. No-backs 505 may be spaced along no-backs rail 150. Top wind jack 105 may be operatively coupled to no-backs rail 150 such that extension of wind jack 105 raises no-backs rail 150, and retraction of wind jack 105 lowers horizontal rail through a continuum of positions, or vice versa. As shown in FIG. 6, top wind jack 105 may raise and lower no-backs rail 150, be operated by handheld drill 300 and may include telescoping cylinder 310 and shaft 305. No-backs 505 may include rubber padding to minimize noise during movement. Wind jack 105 may be mounted to frame 125 with mounting system 600 that may include pipes, bars, brackets and/or supports.

Figure 7A:
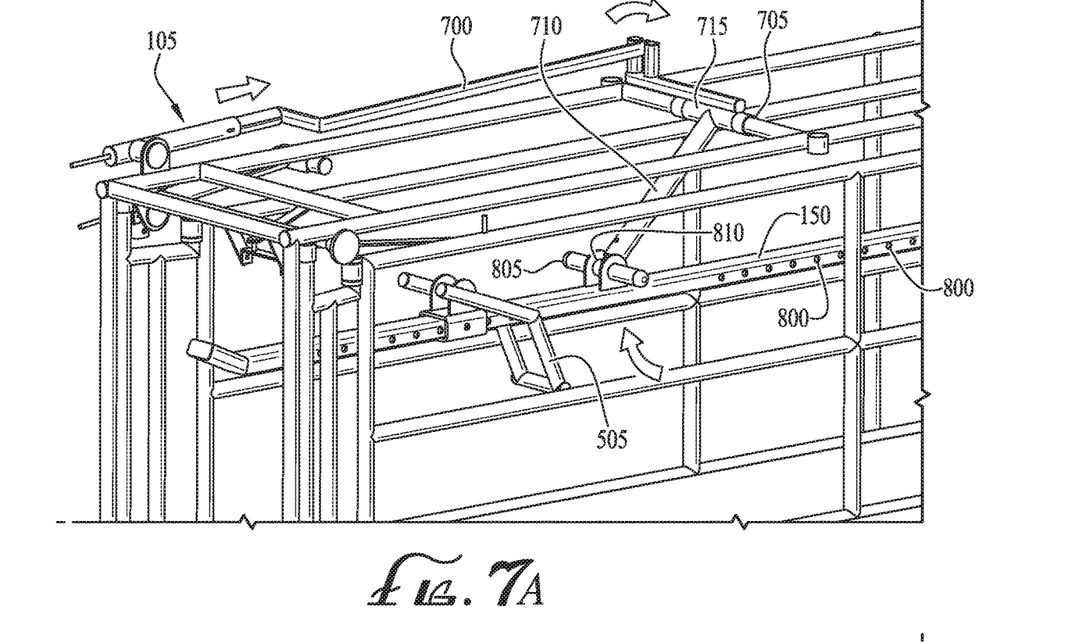
FIG. 7A is a perspective view of a no-backs rail of an illustrative embodiment actuating upwards.
Figure 7B:
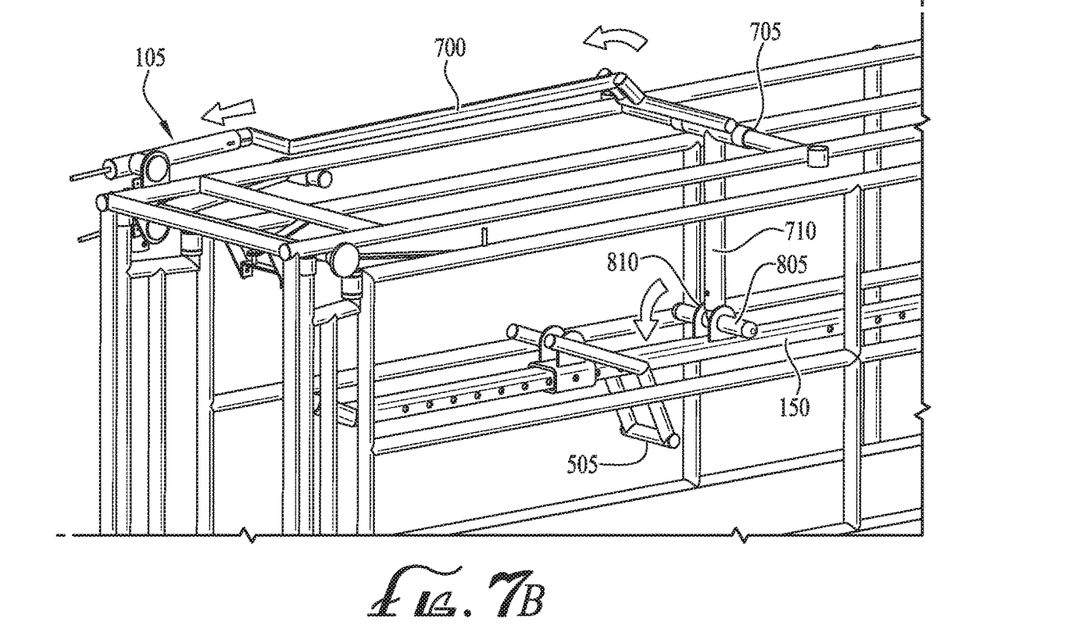
FIG. 7B is a perspective view of a no-backs rail of an illustrative embodiment actuating downwards.

FIG. 7A and FIG. 7B illustrate actuation of no-backs rail 150 by wind jack 105. FIG. 7A illustrates raising of no-backs rail 150 containing no-backs 505, and FIG. 7B illustrates lowering no-backs rail 150 containing no-backs 505. As shown in FIG. 7A, as top wind jack 105 extends, bent tube 700 may rotate support pipe 705 clockwise to raise no-backs rail 150. As shown in FIG. 7B, upon retraction of wind jack 105, bent tube 700 may rotate support pipe 705 counterclockwise to lower no-backs rail 150. Linking tube 710 may connect support pipe 705 with no-backs rail 150 and linking tube 710 may rotate, pivot and/or hinge with respect to support pipe 705 and/or no-backs rail 150. As shown in FIG. 7B, linking tube 710 may extend perpendicularly to support pipe 705 and no-backs rail 150 when lowered to the minimum possible height. The top side of linking tube 710 may be pivotably coupled to horizontally mounted support pipe 705 enclosed in sleeve 715 at the top of frame 125. When horizontally mounted support pipe 705 rotates by the force of bent tube 700, no-backs rail 150 may lift or lower. The pivot and/or hinge between bent tube 700 and support pipe 705, between support pipe 705 and linking tube 710 and/or between linking tube 710 and no-backs rail 150, may allow the lowering and raising of no-backs rail 150 upon operation of wind jack 105.

Figure 10:
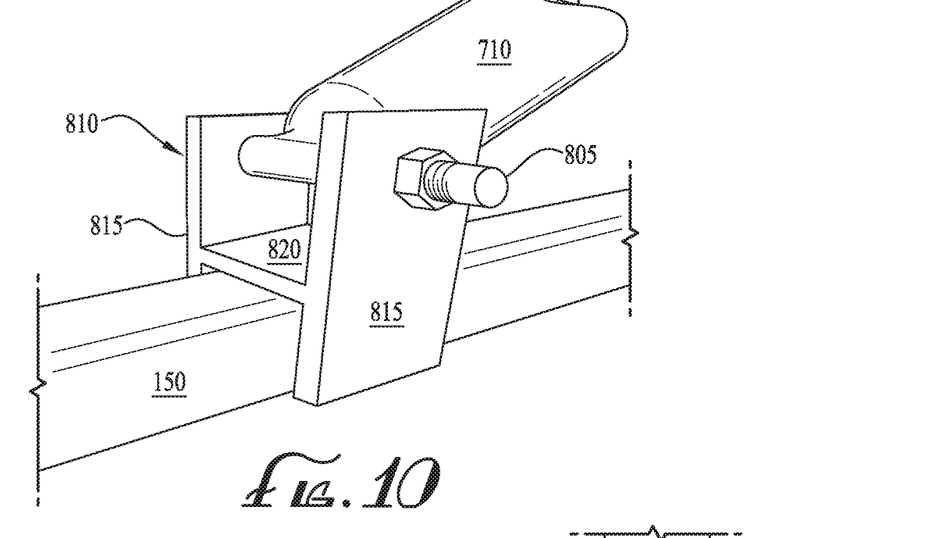
FIG. 10 is a perspective view of a strut bracket of an illustrative embodiment for an exemplary no-backs rail.
Figure 11:
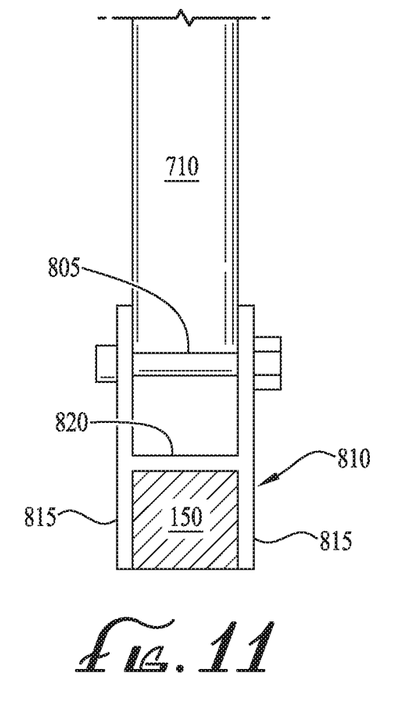
FIG. 11 is a front elevation view of a strut bracket of an illustrative embodiment for an exemplary no-backs rail.

As shown in FIG. 10 and FIG. 11, linking tube 710 may connect on its bottom end to no-backs rail 150 using strut bracket 810 and adjuster strut 805. Strut bracket 810 may be improved over conventional bracket designs to allow strut 805 to connect to no-backs rail 150 on both sides of no-backs rail 150. The use of strut bracket 810 and strut 805 may prevent no-backs rail 150 from wiggling during adjustment and/or use and/or prevent unwanted movement of no-backs 505. Strut bracket 810 may be "H" shaped and may extend like a bridge over no-backs rail 150 around the top and two sides of no-backs rail 150. Strut bracket sides 815 may extend over two sides of no-backs rail 150 and continue to extend upward above no-backs rail 150. Strut bracket cross portion 820 may extend over the top of no-backs rail 150 between strut bracket sides 815. Strut 805 may extend across upper portion of strut bracket sides 815, above no-backs rail 150, and be bolted in place. Strut 805 may couple, connect and/or attach to linking tube 710.

Figure 8:
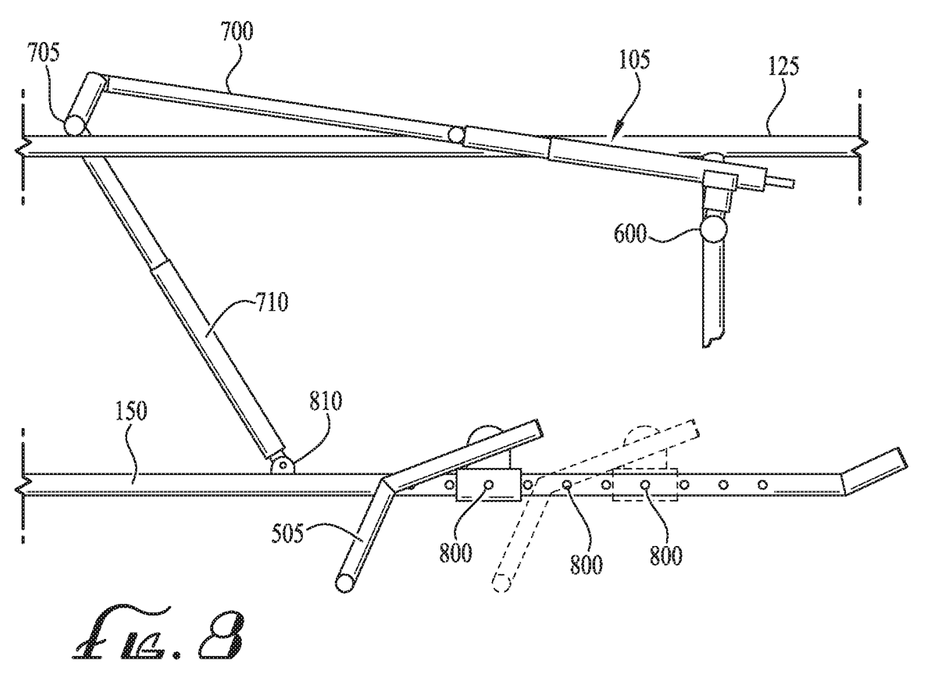
FIG. 8 is a side elevation view of an exemplary no-backs rail with no-backs of an illustrative embodiment adjustable along the length of the exemplary no-backs rail.

Spacing between no-backs 505 may adjust by sliding no-backs 505 along no-backs rail 150, in order to position no-backs 505 based on the length of the animal inside or anticipated to be inside alley passageway 215. No-backs 505 may be spaced for example, to achieve the spacing of no-backs 505 around animal 500 as illustrated in FIG. 5B. For example, a first no-back may be positioned along no-backs rail 150 to rest against the head of animal 500, and an adjacent no-back may fit underneath and/or proximate the tail of the same animal 500. Turning to FIG. 8, no-backs rail 150 may include multiple holes 800 spaced at intervals along no-backs rail 150. No-backs 505 may slide along no-backs rail 150 until aligned with the desired hole 800. Once the spacing of no-backs 505 is as-desired, no-backs 505 may be bolted into place in the desired hole 800, such as by t-bolt 905, to remain secure when animals 500 are present, and in a position appropriate for the length of animals 500 anticipated to be held in passageway 215.

One or more top wind jacks 105 may be individually operated in both clockwise and counterclockwise directions. The direction that each top wind jack 105 is rotated may control the direction of movement of no-backs rail 150 and/or passageway sides 140. For example, rotation of a first top wind jack 105 clockwise may narrow passageway 215 and rotation of the same top wind jack 105 counterclockwise may widen passageway 215, or vice versa. Similarly, rotation of a second top wind jack 105 clockwise may lift no-backs rail 150 including no-backs 505 and rotation of the second top wind jack 105 counterclockwise may lower no-backs rail 150, or vice versa.

Figure 9:
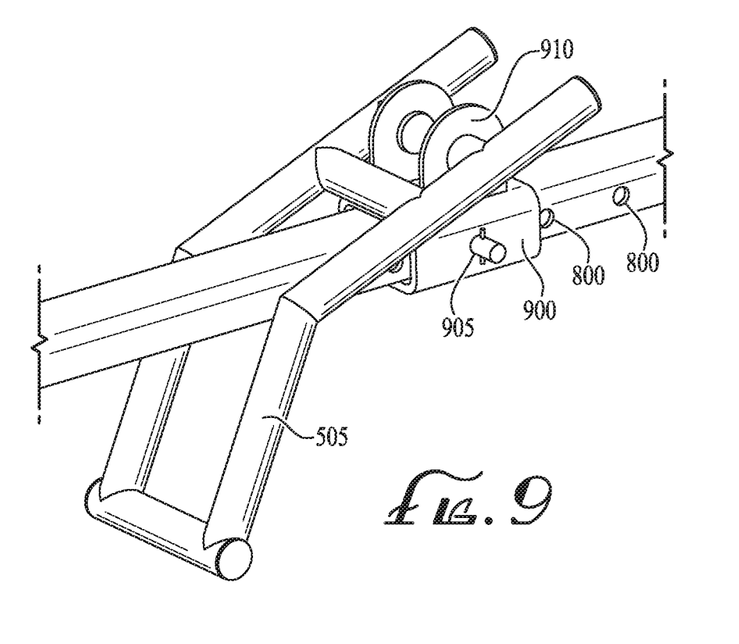
FIG. 9 is a perspective view of a no-backs of an illustrative embodiment.

FIG. 9 illustrates the connection between no-backs 505 and no-backs rail 150. No-backs 505 may be secured along no-backs rail 150 by slideable bracket 900. Slideable bracket 900 may slide along no-backs rail 150 to adjust the position of each no-back 505, and then bolt into place by aligning an aperture in slideable bracket 900 with hole 800 in no-backs rail 150, to secure the no-backs 505 position during use with bolt 905. Connectors 910, which may include brackets and/or strut brackets, may couple no-backs 505 to slideable bracket 900.

Figure 13A:
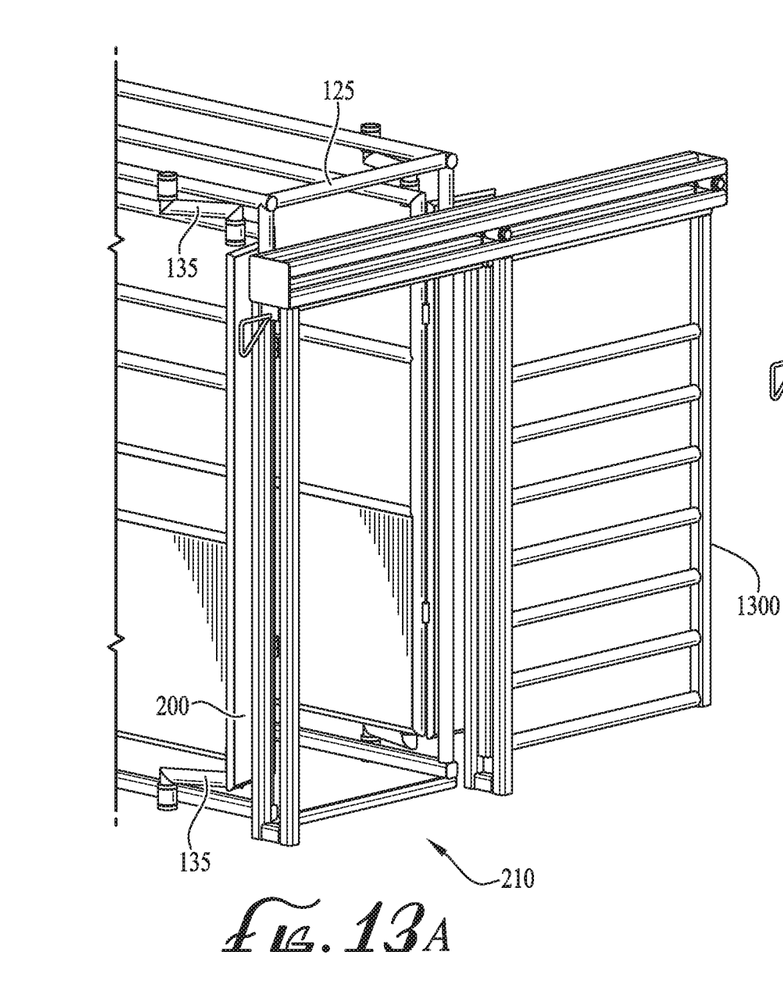
FIG. 13A is a perspective view of an exemplary animal exit of an alley of an illustrative embodiment with an exit door open.
Figure 13B:
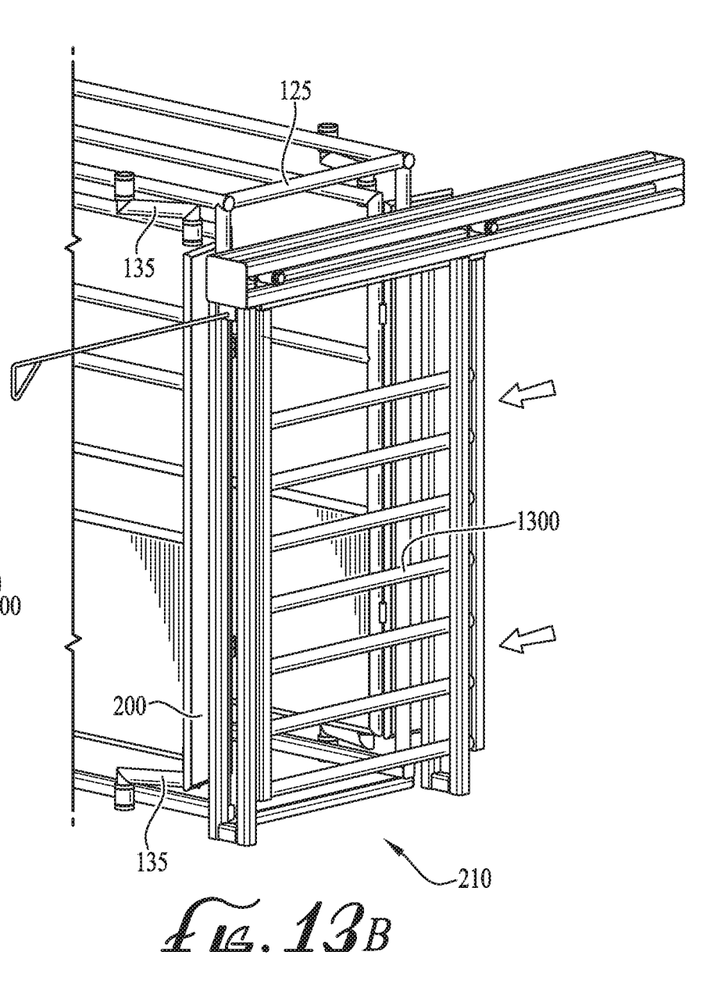
FIG. 13B is a perspective view of an exemplary animal exit of an alley of an illustrative embodiment with an exit door closed.

FIGS. 13A and 13B illustrate an exemplary sliding gate 1300 on exit side 210 of alley 100. A squeeze chute, or head gate may be connected to exit side 210. Sliding gate 1300 may protect a rancher stepping into the squeeze chute.

Illustrative embodiments described herein provide an adjustable livestock alley. The width of animal passageway 215 inside alley 100 may be adjustable using handheld, cordless drill 300. Operation of cordless drill 300 to wind wind jack 105 may simultaneously and evenly move opposing passageway sides 140 of alley 100 inwards or outwards at the same rate, in order to adjust the width of passageway 215 to fit the width of animals 500 without animals 500 having enough space to bend or turn inside passageway 215. Operation of cordless drill 300 with a second wind jack 105 may also raise or lower a set of no-backs 505, thereby adjusting the height of no-backs 505 based on the height of animals 500 to be guided inside alley 100. The spacing of no-backs 505 may be adjusted along no-backs rail 150 to adjust spacing of no-backs 505 for animals 500 of different lengths. Illustrative embodiments may provide a faster and less expensive method of adjusting a livestock alley 100. Animals inside alley 100 may be treated from both sides of alley 100 without obstruction from a catwalk, and the animals inside alley 100 may be able to see outwards, keeping the animals calmer. An improved strut bracket design 810 may employed to allow strut 805 to connect to no-backs rail 150 on both sides of no-backs rail 150. The use of improved strut bracket 810 and strut 805 may prevent no-backs rail 150 from wiggling during adjustment and/or use and/or prevent unwanted movement of no-backs 505.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

What is claimed is:

1. An adjustable livestock alley system comprising:
    an animal passageway formed by two opposing passageway sides, a width of the animal passageway adjustable by a first top wind jack that actuates both passageway sides simultaneously inward and simultaneously outward symmetrically about a centerline of the animal passageway; and
    a no-backs rail comprising a plurality of no-backs, a height of the no-backs rail adjustable by a second top wind jack that actuates the no-backs rail upwards and downwards; and
    wherein each no-backs of the plurality of no-backs are moveably attached to the no-backs rail, and a spacing between adjacent no-backs of the plurality of no-backs is adjustable by sliding each no-backs along the no-backs rail.

2. The adjustable livestock alley system of claim 1, wherein the first top wind jack and the second top wind jack are each interchangeably windable by a drill and a jack handle.

3. The adjustable livestock alley system of claim 1, further comprising:
    an actuatable system of rails coupled to:
        the first top wind jack; and
        each of the two opposing passageway sides; and
    wherein winding the first top wind jack in a first direction actuates the actuatable system of rails to actuate both passageway sides one of simultaneously inward or simultaneously outward symmetrically about the centerline of the animal passageway.

4. The adjustable livestock alley system of claim 1, wherein the no-backs rail extends parallel to a ground along a length of the animal passageway.

5. The adjustable livestock alley system of claim 1, further comprising:
    a system of rails coupled between the second top wind jack and the no-backs rail; and
    an adjuster strut coupling the no-backs rail to the system of rails.

6. The adjustable livestock alley system of claim 5, further comprising:
    the adjuster strut coupled to the no-backs rail with a strut bracket;
    the strut bracket extending around a top and two sides of the no-backs rail; and
    the adjuster strut secured through the strut bracket.

7. The adjustable livestock alley system of claim 1, further comprising at least one sliding end gate coupled between an exit of the animal passageway and a squeeze chute.

8. The adjustable livestock alley system of claim 1, wherein winding the first top wind jack in a first direction actuates both passageways sides simultaneously inward symmetrically about the centerline of the animal passageway, and winding the first top wind jack in a second direction actuates both passageway sides simultaneously outward symmetrically about a centerline of the animal passageway.

* * * * *